US008297688B2

(12) United States Patent
Kanezuka

(10) Patent No.: US 8,297,688 B2
(45) Date of Patent: Oct. 30, 2012

(54) REAR BODY STRUCTURE FOR A VEHICLE, AND VEHICLE INCORPORATING SAME

(75) Inventor: Masashi Kanezuka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 146 days.

(21) Appl. No.: 12/874,454

(22) Filed: Sep. 2, 2010

(65) Prior Publication Data

US 2011/0074183 A1    Mar. 31, 2011

(30) Foreign Application Priority Data

Sep. 25, 2009  (JP) ................. 2009-221473

(51) Int. Cl.
*B60N 2/40* (2006.01)
(52) U.S. Cl. ................. 296/193.08; 297/195.1
(58) Field of Classification Search ........... 297/195.1, 297/219.11, 195.11; 296/193.08
See application file for complete search history.

(56) References Cited

U.S. PATENT DOCUMENTS

| | | | | |
|---|---|---|---|---|
| 1,771,095 A * | 7/1930 | Mesinger | ................. | 297/207 |
| 3,927,727 A * | 12/1975 | Hanagan | ................. | 180/219 |
| 6,247,549 B1 * | 6/2001 | Krams et al. | ................. | 180/219 |
| 6,889,789 B2 * | 5/2005 | Kurayoshi et al. | ............ | 180/219 |
| 8,051,938 B2 * | 11/2011 | Nishijima et al. | ............ | 180/219 |
| 2004/0178011 A1 * | 9/2004 | Lenkman | ................. | 180/210 |
| 2008/0093147 A1 * | 4/2008 | Tanaka | ................. | 180/219 |
| 2009/0107751 A1 * | 4/2009 | Kobayashi et al. | ............ | 180/219 |
| 2009/0114466 A1 * | 5/2009 | Nishijima et al. | ............ | 180/219 |
| 2009/0206626 A1 * | 8/2009 | Bedard | ................. | 296/66 |

FOREIGN PATENT DOCUMENTS

JP           3311400 B2     5/2002

* cited by examiner

*Primary Examiner* — Lori Lyjak
(74) *Attorney, Agent, or Firm* — Carrier Blackman & Associates, P.C.; William D. Blackman; Joseph P. Carrier

(57) ABSTRACT

A rear body structure for a vehicle includes a body cover for covering a vehicle body, a rear grip member attached to a vehicle body frame and configured to be gripped by an occupant of the vehicle during operation of the vehicle, and a rear grip cover attached to and covering the rear grip member. A portion of the body cover overlaps a top surface of the rear grip member. The rear grip member is provided with a body cover positioning section for positioning the body cover thereon. The rear grip cover is arranged above the body cover positioning section of the rear grip member for providing covering thereto. Such vehicle rear body structure provides an improvement in the outward appearance of a rear body structure of a vehicle.

20 Claims, 10 Drawing Sheets

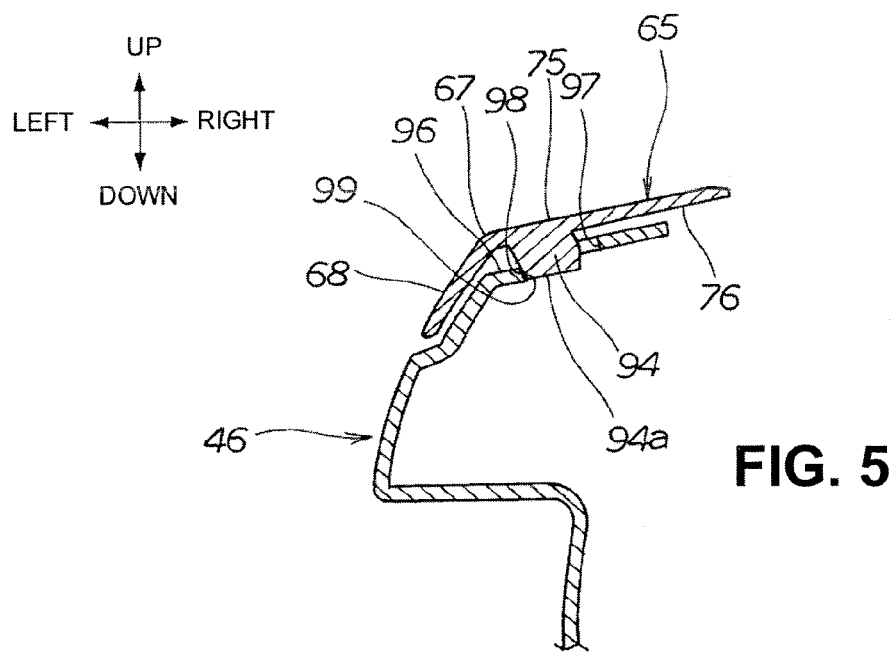
FIG. 5
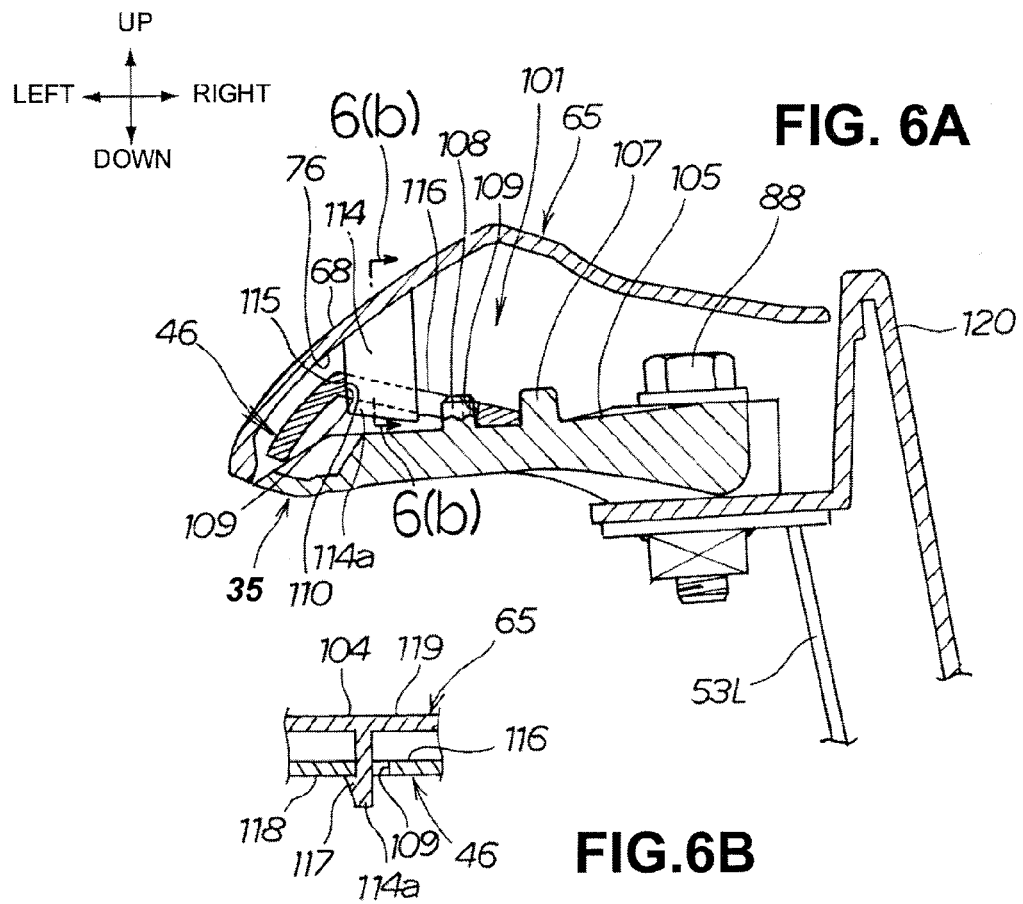
FIG. 6A
FIG. 6B

REAR BODY STRUCTURE FOR A VEHICLE, AND VEHICLE INCORPORATING SAME

CROSS-REFERENCE TO RELATED APPLICATIONS

The present invention claims priority under 35 USC 119 based on Japanese patent application No. 2009-221473, filed on Sep. 25, 2009. The entire subject matter of this priority document, including specification claims and drawings thereof, is incorporated by reference herein.

BACKGROUND OF THE INVENTION

1. Field of the Invention

The present invention relates to a rear body structure for a vehicle equipped with a body cover, and to a vehicle incorporating the same. More particularly, the present invention relates to a rear body structure including a body cover arranged below a seat, a grip member located behind the seat, and a grip cover attached to the rear grip member and flushed with the body cover, and to a vehicle incorporating the same.

2. Description of the Background Art

There is a known rear body structure for a vehicle provided with a body cover for covering a vehicle body under the occupant seat in which an occupant sits. An example of such rear body structure for a vehicle is disclosed in JP Patent No. 3311400 (see FIG. 1 thereof).

As shown in FIG. 1 of JP Patent No. 3311400, a body cover (15) (a parenthetic figure represents a reference sign described in the reference, which applies to the following) is provided under an occupant seat (6) to cover a vehicle body. A cover (31) is provided above a rear portion of the body cover (15) and in a behind the occupant seat (6) to cover the luggage-rack frame (28).

In the rear body structure for a vehicle, as disclosed in JP Patent No. 3311400, however, the body cover (15) and the cover (31) are discrete members. Further, because the body cover (15) and the cover (31) are disposed away from each other, the outward appearance of a vehicle is less appealing, and there is room for improvement particularly in the motorcycle rear body structure.

The present invention is therefore made in consideration of such circumstances. Accordingly, it is one of the objects of the present invention to provide a rear body structure for a vehicle, which allows improvement in the appearance of a rear body structure of the vehicle.

SUMMARY OF THE INVENTION

In order to achieve the above objects, the present invention according to a first aspect thereof provides a rear body structure for a vehicle. The rear body structure for the vehicle includes an occupant seat configure to be occupied by an occupant (i.e., on which an occupant sits), a body cover which is located below the occupant seat, and configured to cover a vehicle body, a rear grip member which is located in the behind the occupant seat, and attached to a vehicle body frame for allowing an occupant to hold the rear grip member, and a rear grip cover which is attached to the rear grip member, and which covers the rear grip member.

The present invention according to the first aspect thereof is characterized in that a portion of the body cover overlaps a top surface of the rear grip member, a body cover positioning section for positioning the body cover is provided on the top surface of the rear grip member, and a part which is provided to the body cover and positioned by the body cover positioning section is covered with the rear grip cover from above.

The present invention according to a second aspect thereof, in addition to the first aspect, is characterized in that the rear grip cover is provided with an engagement member which is placed closer to an edge of the rear grip cover than a portion covering the body cover positioning section, and engages with the body cover.

The present invention according to a third aspect, in addition to one of the first and second aspects, is characterized in that the rear grip cover is structured such that an external surface is continuously adjacent to the body cover through a joint section in a direction approximately perpendicular to a fore-and-aft direction of a vehicle, the portion, which is included in the body cover and positioned by the body cover positioning section of the rear grip member, is placed away from an external surface of the body cover through a vertical wall which extends in a direction approximately perpendicular to the external surface and has a normal extending approximately in the fore-and-aft direction of the vehicle, and the rear grip member is fastened to the vehicle body frame by use of a mounting hole of an oval shape elongated in the fore-and-aft direction of the vehicle and a bolt.

Advantageous Effects of Invention

According to the first aspect of the present invention, since the body cover positioning section is provided on the rear grip member and the rear grip cover is located above the body cover positioning section to cover it, it is possible to make the body cover positioning section appear to be substantially flush.

In addition, the rear grip cover and the body cover are both supported by the rear grip member. Since the rear grip cover and the body cover are attached to the rear grip member serving as a reference, the rear grip cover and the body cover can be attached with an increased assembly accuracy. If the assembly accuracy is increased, the joint sections of the rear grip cover and the rear body cover can be smoothly joined together. Because the joint sections are evenly joined, the outward appearance of the vehicle can be improved.

According to the second aspect of the present invention, the rear grip cover is provided with an engagement member, located closer to an edge of the rear grip cover than the portion covering the body cover positioning section, and which engages the body cover. As long as the engagement member is formed in this manner, the rear grip cover can be positioned correctly with respect to the rear body cover, thus making it possible to more evenly connect the joint sections of the rear grip cover and the rear body cover to each other. The outward appearance of the vehicle can be improved because of the smooth connection of the joint sections.

According to the third aspect of the present invention, the rear grip cover is structured such that the exterior surface is continuously adjacent to the body cover through a joint section which extends in a direction approximately perpendicular to the fore-and-aft direction of the vehicle. A part, which is included in the body cover and is positioned with respect to the body cover positioning section of the rear grip member, is disposed away from the external surface of the rear body cover through a vertical wall which is formed to be at approximately right angles to the external surface of the rear grip cover and has a normal extending approximately in the fore-and-aft direction of the vehicle.

With such a structure, while the body cover and the rear grip cover are positioned with respect to the rear grip member, a gap in the joint section can be adjusted by use of deflection of the vertical wall which is formed to have a normal extending approximately in the fore-and-aft direction of the vehicle.

Further, the fastening of the rear grip member to the vehicle body frame is achieved by use of a mounting hole, having an oval shape elongated in the fore-and-aft direction of the vehicle, and a bolt which extends through the mounting hole.

With such a structure, a dimension error in the vehicle longitudinal direction which is included in the body cover can be absorbed by moving the rear grip member in a vehicle longitudinal direction. In the case where the body cover has been attached to the vehicle body frame before the rear grip member is fixed to the vehicle body frame, when the rear grip cover is attached to the rear grip member, the position of the rear grip cover engaging with the rear grip member can be moved in the vehicle longitudinal direction by moving the rear grip member in the vehicle longitudinal direction.

In other words, the movement of the rear grip member in the vehicle longitudinal direction makes it possible to adjust the positional relationship between the body cover and the rear grip cover. If the adjustment for the positional relationship between the body cover and the rear grip cover is made possible, the surface of the body cover and the surface of the rear grip cover can be easily made flush with each other, thus making it possible to further improve the outward appearance of the vehicle rear area.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 5 is a sectional view taken along line 5-5 in FIG. 2.

FIG. 6A is a sectional view taken along line 6-6 in FIG. 2.

FIG. 6B is a sectional view taken along line 6(b)-6(b) in FIG. 6A.

DETAILED DESCRIPTION OF ILLUSTRATIVE EMBODIMENTS

Figure 1:
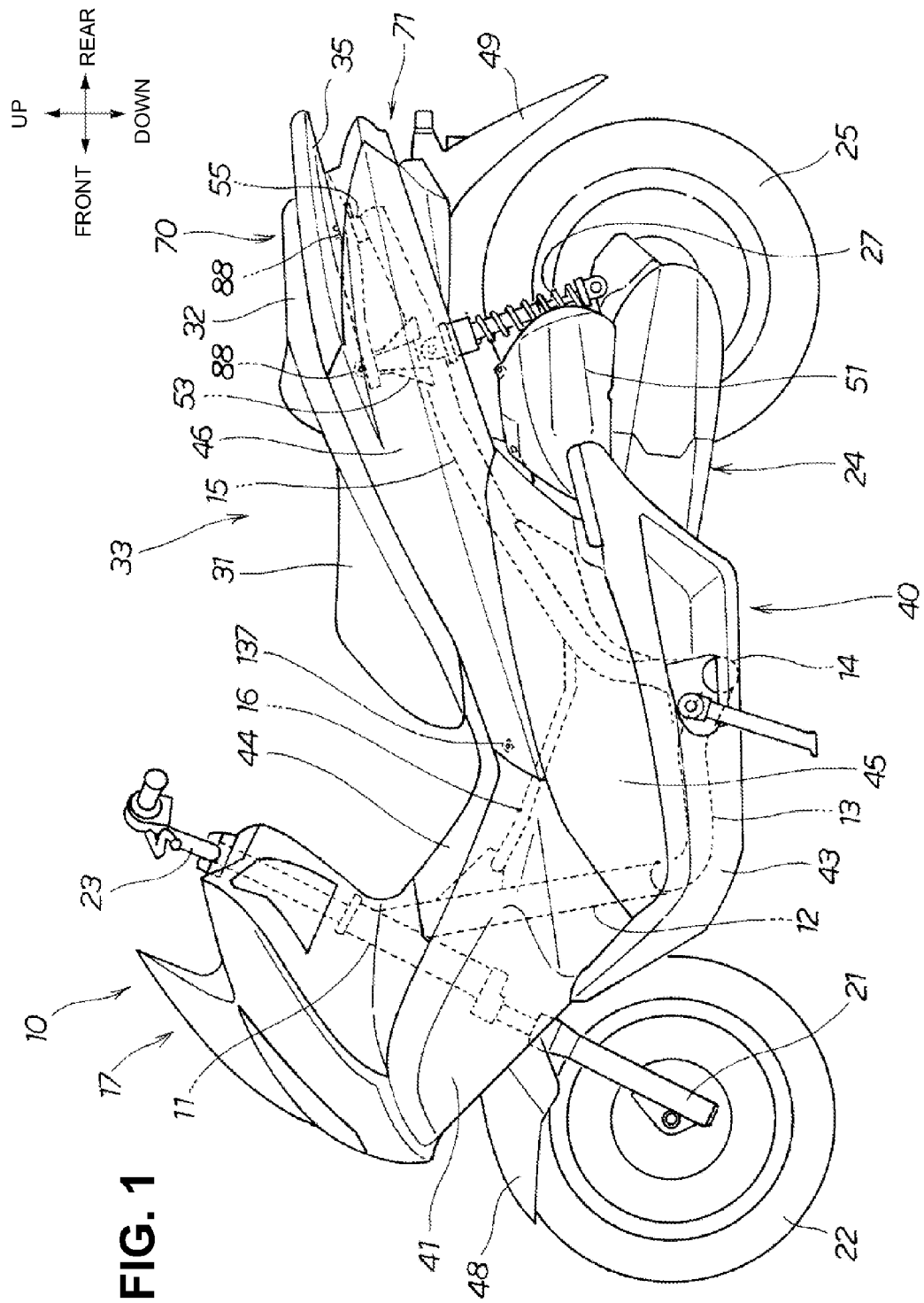
FIG. 1 is a left side view of a motorcycle according to the present invention.

An illustrative embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

In other words, the terms "upward/upper", "downward/lower", "forward/front", "rearward/rear", "leftward/left" and "rightward/right" used in the drawings and an example refer respectively to directions when viewed by a rider sitting on a motorcycle. In this regard, it may be assumed that the drawings are viewed in the orientation of the reference signs.

As shown in FIG. 1, a motorcycle 10, which is a vehicle, is of a scooter type vehicle. The motorcycle 10 includes a vehicle body frame 17 having a down frame 12 which extends diagonally rearward and downward from a head pipe 11, a main frame 13 which extends rearward from the down frame 12, a cross frame 14 which is provided at the rear end of the main frame 13 and which extends in the vehicle transverse direction, a seat rail 15 which extends diagonally upward and rearward from the cross frame 14, and a sub-frame 16 which extends between the down frame 12 and the seat rail 15 in the vehicle longitudinal direction.

Further, the motorcycle 10 includes a front fork 21 steerably mounted to the head pipe 11; a front wheel 22 mounted in the front fork 21; a handlebar 23 steerably attached to the top end of the front fork 21; a power unit 24 attached to the behind the main frame 12 such that the power unit 24 can vertically swing; a rear wheel 25 mounted on the power unit 24; a rear cushion unit 27 interposed between the power unit 24 and the seat rail 15; and an occupant seat 33 placed on the seat rail 15. The occupant seat is made up of a rider seat 31 for a rider sitting therein and a pillion 32 arranged close to and behind the rider seat 31 for a pillion passenger sitting therein;

Furthermore, the motorcycle 10 includes a rear grip member 35 disposed behind the occupant seat 33 and attached to the vehicle body frame 17 such that the occupant (i.e. pillion passenger), can hold the rear grip member 35 during operation of the vehicle. The head pipe 11 and the down frame 12 are surrounded with a front body cover 41. An area above the sub-frame 16 is surrounded with a tunnel cover 44; the seat rail 15 is surrounded with a center body cover 45 and an underbody cover 43 which is placed under the center body cover 45 and includes a leg shield; and the area behind the seat rail 15 is surrounded with a rear body cover 46. The occupant(s) of the vehicle may include a rider and, optionally, a pillion passenger.

A main body cover 40 is a member for covering the vehicle body, which is made up of the front body cover 41, the tunnel cover 44 placed above the front body cover 41, the center body cover 45 placed continuously adjacent to the front body cover 41 and extending in the rear direction of the front body cover 41, the underbody cover 43 placed continuously adjacent to the center body cover 45 in a position below the center body cover 45 and extending rearward, and the rear body cover 46 placed above the center body cover 45 and below the occupant seat 33 and extending rearward.

Note that the positions of dividing the body cover are not limited to those in the example, and can be changed as appropriate. For example, the rear body cover may be formed integrally with the center body cover.

A front fender 48 as a mudguard is provided above the front wheel 22, while a rear fender 49 is placed diagonally upward and rearward from the rear wheel 25. An air cleaner 51 is mounted to the power unit 24 under the rear body cover 46.

Next, the rear body structure 70 of the vehicle according to the present invention will be described. The occupant seat is removed in the drawings other than in FIG. 1.

Figure 2:
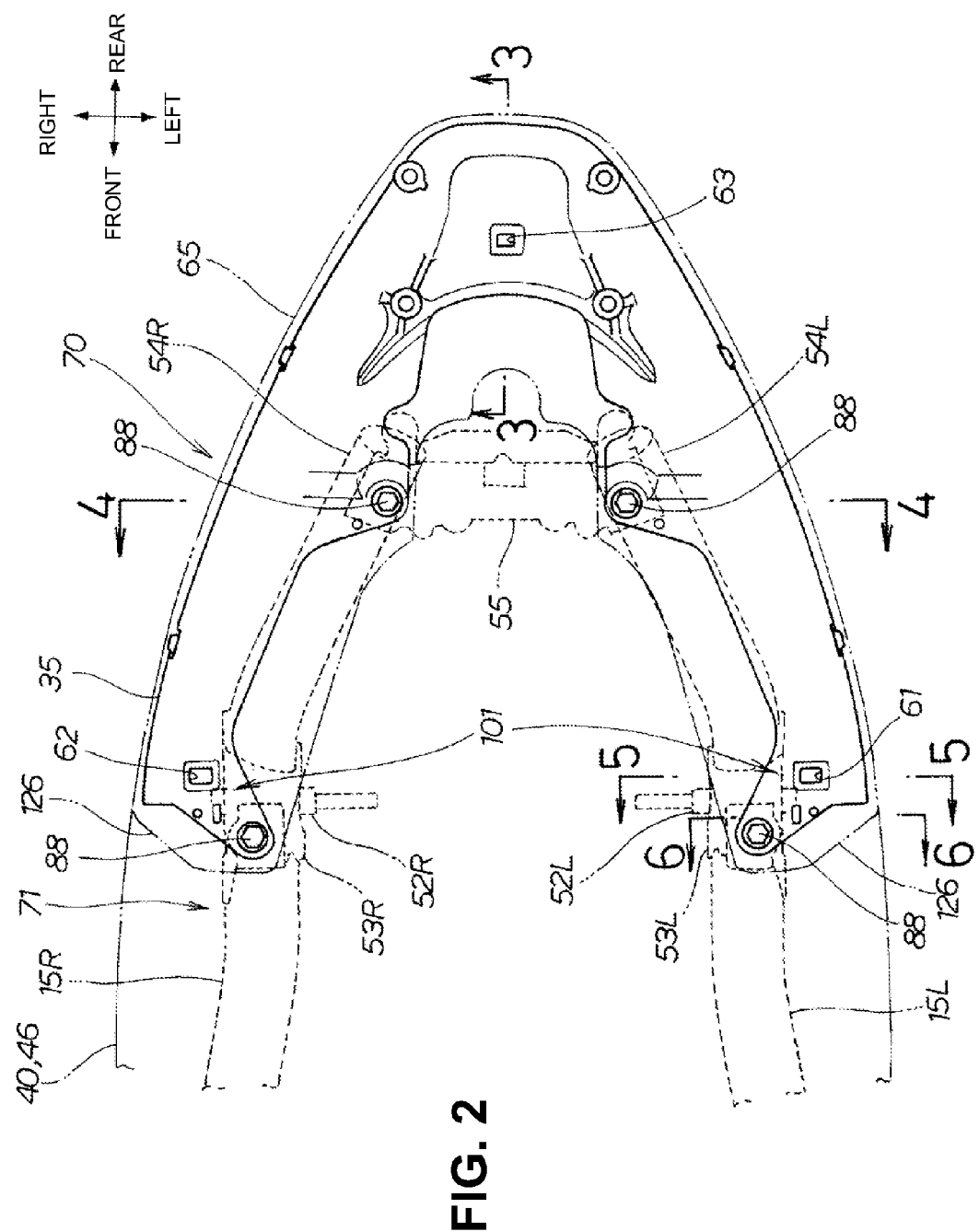
FIG. 2 is a top view of a rear body structure for a vehicle included in the motorcycle according to the present invention.

As shown in FIG. 2, right and left front brackets 53R, 53L are provided for attaching the rear grip member 35 in proximity to supporting parts 52R, 52L which support upper ends of the rear cushion units to the right and left seat rails 15R, 15L. A rear bracket 55 is provided for attaching the rear grip member 35 between rear ends 54R, 54L of the right and left seat rails so as to extend between the right and left seat rails 15R, 15L.

The rear grip member 35 is attached to the right and left front brackets 53R, 53L and the rear bracket 55. A first fitting hole 61, a second fitting hole 62 and a third fitting hole 63 are formed in the rear grip member 35. A rear grip cover 65 is fitted into the first to third fitting holes 61 to 63, so that the rear grip member 35 is covered with the rear grip cover 65.

A part of the rear body cover 46 of the main body cover 40, is held between the rear grip member 35 and the rear grip cover 65. Details on the structure of disposing a part of the rear body cover 46 between the rear grip member 35 and the rear grip cover 65 are described later.

Specifically, the rear structure 70 includes the rear body cover 46 covering the vehicle body 71, the rear grip member 35 attached to the vehicle body frame 17 such that an occupant can hold the rear grip member 35, and the rear grip cover 65 attached to the rear grip member 35 for covering the rear grip member 35.

Next, a description will be given of the structure of attaching the rear grip member 35 and the rear grip cover 65 to each other.

Figure 3:
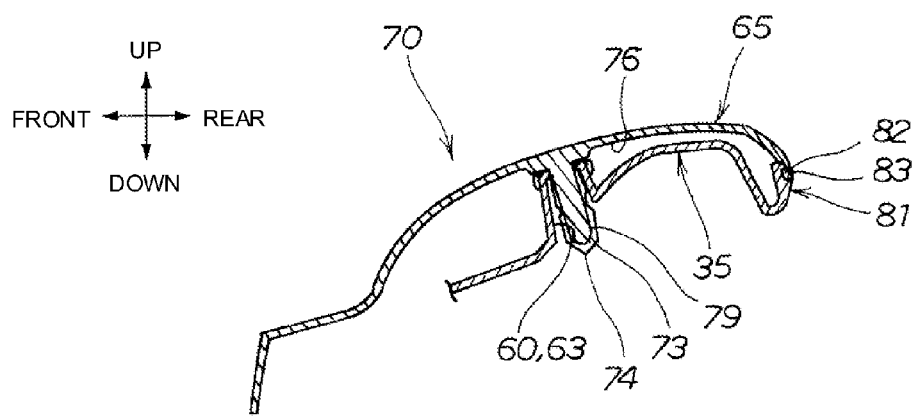
FIG. 3 is a sectional view taken along line 3-3 in FIG. 2.

As shown in FIG. 3, a third fitting hole 63 is drilled in the rear grip member 35. The third fitting hole 63 is a component element forming part of the fitting hole 60. A stopper member 74 is provided in the third fitting hole 63 for holding a fitting tab 73 formed of an elastic member within the third fitting hole 63. A third tab 79, which is a component element forming part of the fitting tab 73, extends downward from the bottom surface 76 of the rear grip cover. The third tab 79 is engaged with the stopper member 74 fitted into the third fitting hole 63.

An engaging recess 83 is formed in a rear end edge 81 of the rear grip member 35, and engaged with an rear end edge 82 of the rear grip cover so that the rear grip member 35 and the rear grip cover 65 are smoothly continuously joined together.

Next, the structure of attaching the rear grip member, and the like will be described.

Figure 4:
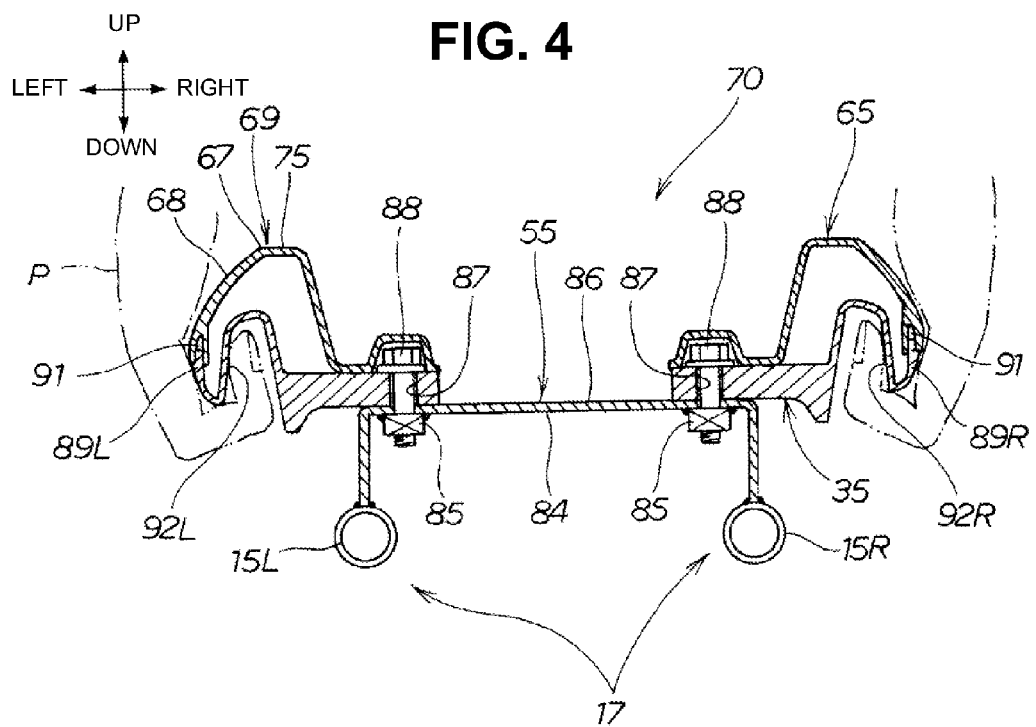
FIG. 4 is a sectional view taken along line 4-4 in FIG. 2.

As shown in FIG. 4, weld nuts 85 are securely fixed to the under surface 84 of the rear bracket disposed between the right and left seat rail 15R, 15L. The rear grip member 35 is placed on the upper surface 86 of the rear bracket 55. Mounting holes 87 are provided in the rear grip member 35. Bolts 88 are inserted through the mounting holes 87 and then engaged with the weld nuts 85 which are securely fixed to the rear bracket 55 provided on the vehicle body frame 17. The mounting holes 87 have an oval shape elongated in the vehicle longitudinal direction such that the position of the rear grip member 35 can be adjusted in the vehicle longitudinal direction, as described later.

Similarly, the front portion of the rear grip member 35 is fastened to the front brackets 53R, 53L respectively provided on the right and left seat rails 15R, 15L with bolts 88.

The rear grip cover 65 is arranged above the rear grip member 35.

Engagement protrusions 91 are formed at right and left outer edges 89R, 89L of the rear grip member such that the rear grip member 35 and the external surface of the rear grip cover 65 are smoothly continuously connected to each other.

Grippers 92R, 92L are formed on the rear grip member 35 to allow an occupant P to hold the grippers 92R, 92L. In the illustrative embodiment, the rear grip member 35 is die-cast of aluminum. However, the rear grip member may be formed of any suitable material.

The rear grip cover 65 is arranged above the rear grip member 35. The rear grip cover 65 includes a substantially flattened top surface 75, a slope 68 extending diagonally downward continuously from the top surface 75, and a ridge line 67 forming a boundary between the slope 68 and the top surface 75. The rear grip cover 65 is made of resin.

Figure 7:
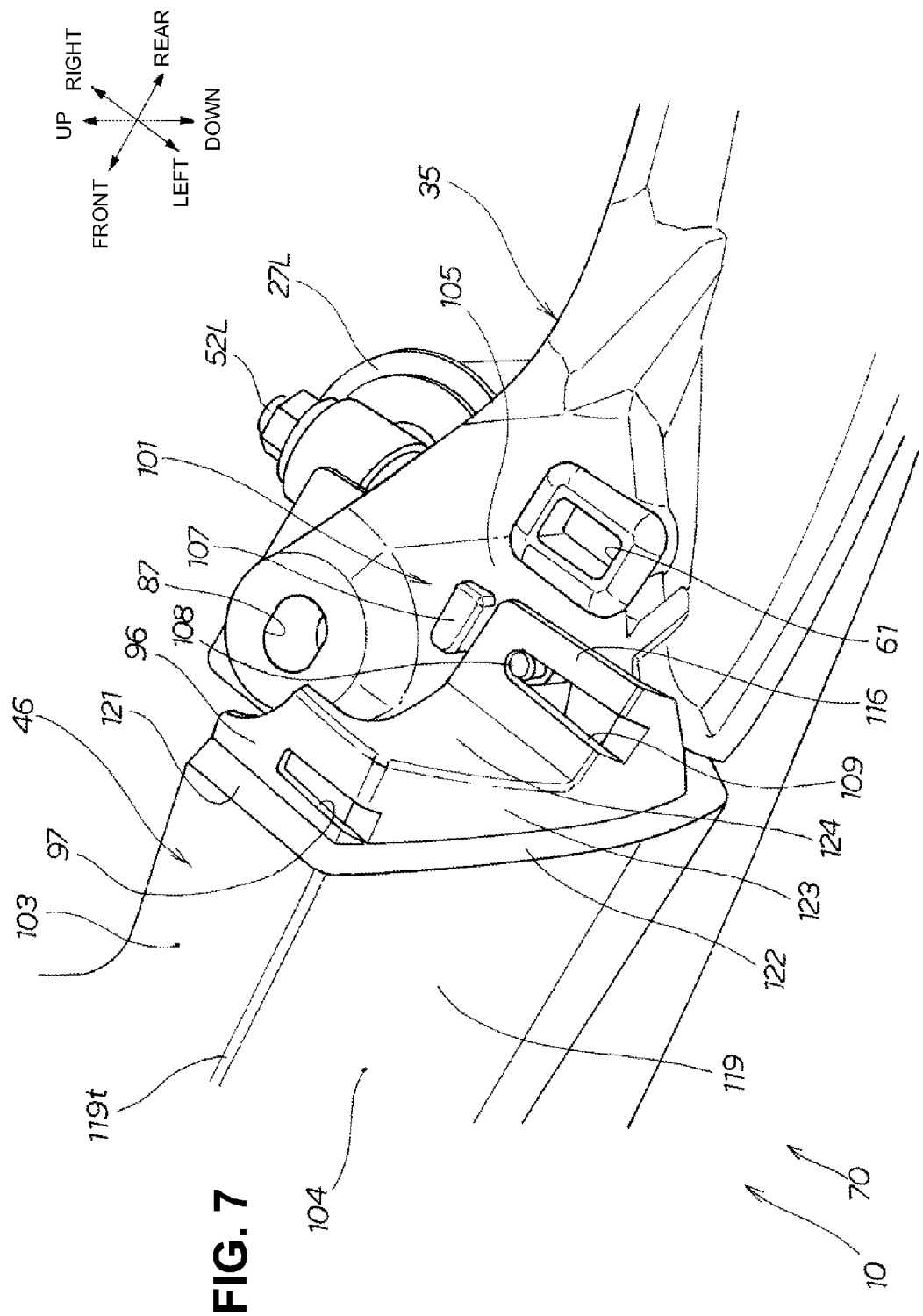
FIG. 7 is a perspective view of a body-cover positioning section included in the motorcycle according to the present invention.

With reference to FIG. 5 through FIG. 7, structure of an engagement section extending from the rear grip cover toward the body cover to engage with the body cover, and a body cover positioning section formed in the rear grip member are described.

As shown in FIG. 5, a first engagement member 94 extends downward from the bottom surface 76 of the rear grip cover in such a manner as to protrude therefrom and engages with the rear body cover 46. A lead end 94a of the first engagement member is engaged in a first engaging hole 97 drilled in a first rack 96 provided in a rear portion (a portion corresponding to an edge close to the rear grip member) of the rear body cover 46.

An outer side face 98 of the leading end 94a of the first engagement member in the vehicle traverse direction is abutted on an inner side face 99 of the first engaging hole in the vehicle traverse direction. Since the first engagement member 94 is engaged in the first engaging hole 97 such that the outer side face 98 of the first engagement member is abutted on the inner side face 99 of the first engaging hole, the rear grip cover 65 can be prevented from shifting outward from the rear body cover 46. It may be noted that the length of the first engaging hole 97 in the fore-and-aft direction of the vehicle is set to be slightly longer than that of the first engagement member 94 in the fore-and-aft direction of the vehicle.

As shown in FIG. 6A, the rear grip member 35 includes a body cover positioning section 101 for positioning the rear body cover 46. The body cover positioning section 101 includes a seating surface 105 on which a part of the rear body cover 46 is abutted, a first protrusion 107 formed on the seating surface 105, and a second protrusion 108 protruding in a position outward from the first protrusion. A second engaging hole 109 formed in the rear body cover 46 is engaged with the second protrusion 108. With such structure, the rear body cover 46 can be positioned with respect to the rear grip member 35. It may be noted that the body cover positioning section 101 is covered with the rear grip cover 65 lying from above, thereby sandwiching a portion of the rear body cover 46 between the rear grip member 35 and the rear grip cover 65.

Specifically, a second engagement member 114 extends downward from the bottom surface 76 (or "lower surface 76") of the rear grip cover so as to protrude therefrom. The leading end 114a of the second engagement member is engaged in a second engaging hole 109 which formed in a second rack 116 provided in the rear portion of the rear body cover 46.

In other words, the second engagement member 114 is provided in the rear grip cover 65, and engages with the rear body cover 46 in a position closer to the outer edge of the rear grip cover 65 in the vehicle transverse direction than the position of the portion covering the body cover positioning section 101.

An outer side face 115 of the second engagement member 114 in the vehicle transverse direction is abutted on an inner side face 110 of the second engaging hole 109 in the vehicle transverse direction. Due to such configuration, the rear grip cover 65 can be prevented from shifting outward from the rear body cover 46.

As shown in FIG. 6B, a hook 117 is formed at the leading end 114a of the second engagement member, and inserted to be engaged with a back surface 118 of the rear body cover. For this reason, a slope 104, which is a component element of the external surface 119 of the rear grip cover, can be prevented from curling upward.

Returning to FIG. 6A, a luggage box 120 serving as a storage container provided in the vehicle and the rear grip member 35 are both secured to the front bracket 53L with the bolt 88.

The front bracket 53R provided on the left side of the vehicle has a similar securing structure to that of the front bracket 53L.

As shown in FIG. 7, an external surface 119 of the rear body cover is formed on the rear portion of the rear body cover 46. The external surface 119 of the rear body cover includes a top face portion (top surface) 103, a slope 104 extending downward continuously from the top surface 103, and a ridge line 119t forming a boundary between the slope 104 and the top face portion 103.

The rear body cover 46 has a rear portion including: a first vertical wall 121 bending and extending downward of the vehicle from the top surface 103 defined in the exterior surface 119 of the rear body cover 46; a second vertical wall 122 bending and extending inward of the vehicle from the exterior surface 119 of the rear body cover; a first rack 96 and a slope inner wall 123 respectively extending rearward of the vehicle from the first vertical wall 121 and the second vertical wall 122; and a first engaging hole 97 formed in the first rack 96 to allow the engagement of the first engagement member (reference sign 94 in FIG. 5) of the rear grip cover.

The rear portion of the rear body cover also includes a main vertical wall 124 extending downward from the first rack 96 and formed such that a normal to the main vertical wall 124 extends approximately in the fore-and-aft direction of the vehicle; a second rack 116 extending from the main vertical wall 124 in the backward direction of the vehicle; and a second engaging hole 109 formed in the second rack 116 to allow the engagement of the second engagement member (reference sign 114 in FIG. 6) of the rear grip cover. The first vertical wall 121 and the second vertical wall 122 are the same surface.

The body cover positioning section 101 for positioning the rear body cover 46 is formed in the seating surface 105 provided on the rear grip member 35. The body cover positioning section 101 includes the first protrusion 107 having an approximately rectangular shape in a top view of the vehicle, and the second protrusion 108 located outward from the first protrusion 107 and having an approximately circular shape in a top view of the vehicle. The second engaging hole 109 formed in the body cover is engaged with the second protrusion 108. In this step, in such a manner as to fit the second rack 116 into the space between the first protrusion 107 and the second protrusion 108 in the vehicle transverse direction, the position of the rear body cover 46 in the right-and-left direction is determined with respect to the rear grip member 35. The first engagement member 94 and the second engagement member 114, which are part of the rear grip cover, are overlaid on the upper surface of the rear grip member 35.

The length of the second engaging hole 109 in the fore-and-aft direction of the vehicle is approximately equal to the length of the second protrusion 108 in the fore-and-aft direction of the vehicle, thereby achieving the positioning in the fore-and-aft direction of the vehicle.

As shown in FIGS. 5, 6A and 6B, the rear grip member 35 includes the body cover positioning section 101 for positioning the rear body cover 46e. The second engagement member 114 is provided in a position of the rear grip cover 65 located outward from a portion covering the body cover positioning section 101 in the vehicle transverse direction, for engaging with the rear body cover 46 such that the rear grip cover 65 lies above the body cover positioning section 101.

Next, the joint structure of the motorcycle body cover and the rear grip cover 65 will be described.

Figure 8:
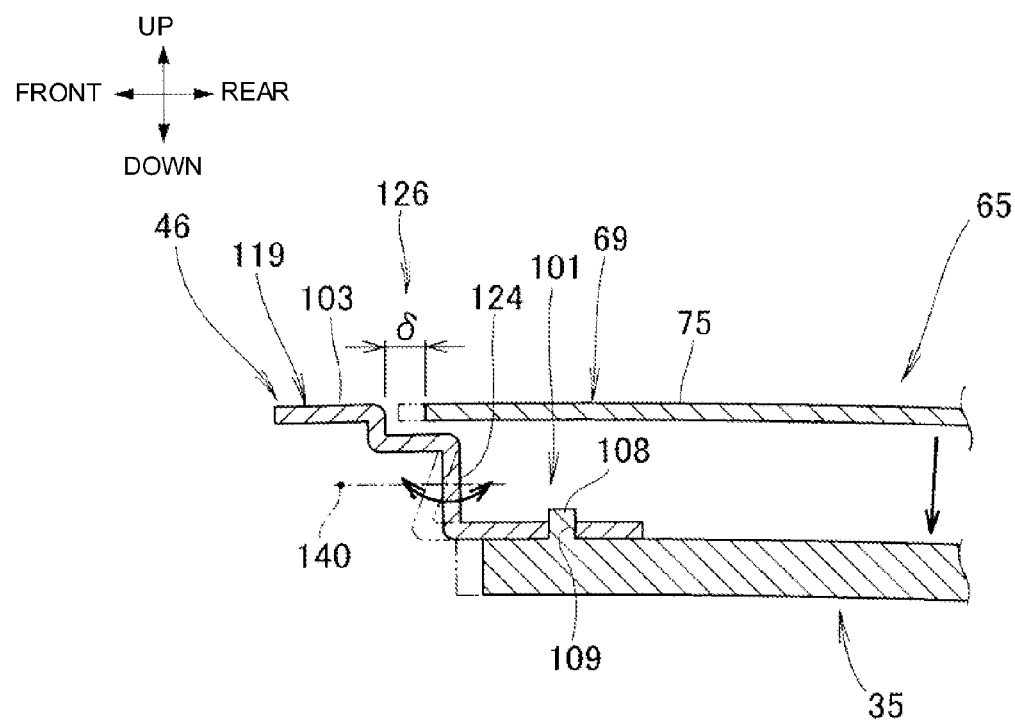
FIG. 8 is a sectional view illustrating a structure of joining a body cover and a rear grip cover together in the motorcycle according to the present invention.

As shown in FIG. 8, the rear grip cover 65 is structured such that the exterior surface 69 of the rear grip cover is joined continuously to the external surface 119 of the rear body cover through a joint section 126 which extends in a direction approximately perpendicular to the fore-and-aft direction of the vehicle. A portion (the main vertical wall 124) of the rear body cover 46, which is positioned with respect to the body cover positioning section 101 of the rear grip member 35, is disposed away from the external surface 119 of the rear body cover through the main vertical wall 124 which is formed to be approximately perpendicular to the external surface 69 of the rear grip cover and has a normal 140 extending approximately in the fore-and-aft direction of the vehicle.

With such a structure, while the rear body cover 46 and the rear grip cover 65 are positioned with respect to the rear grip member 35, the gap (δ) created in the joint section 126 can be adjusted by use of deflection of the vertical wall 124 which is formed to have the normal 140 extending approximately in the fore-and-aft direction of the vehicle.

Figure 9:
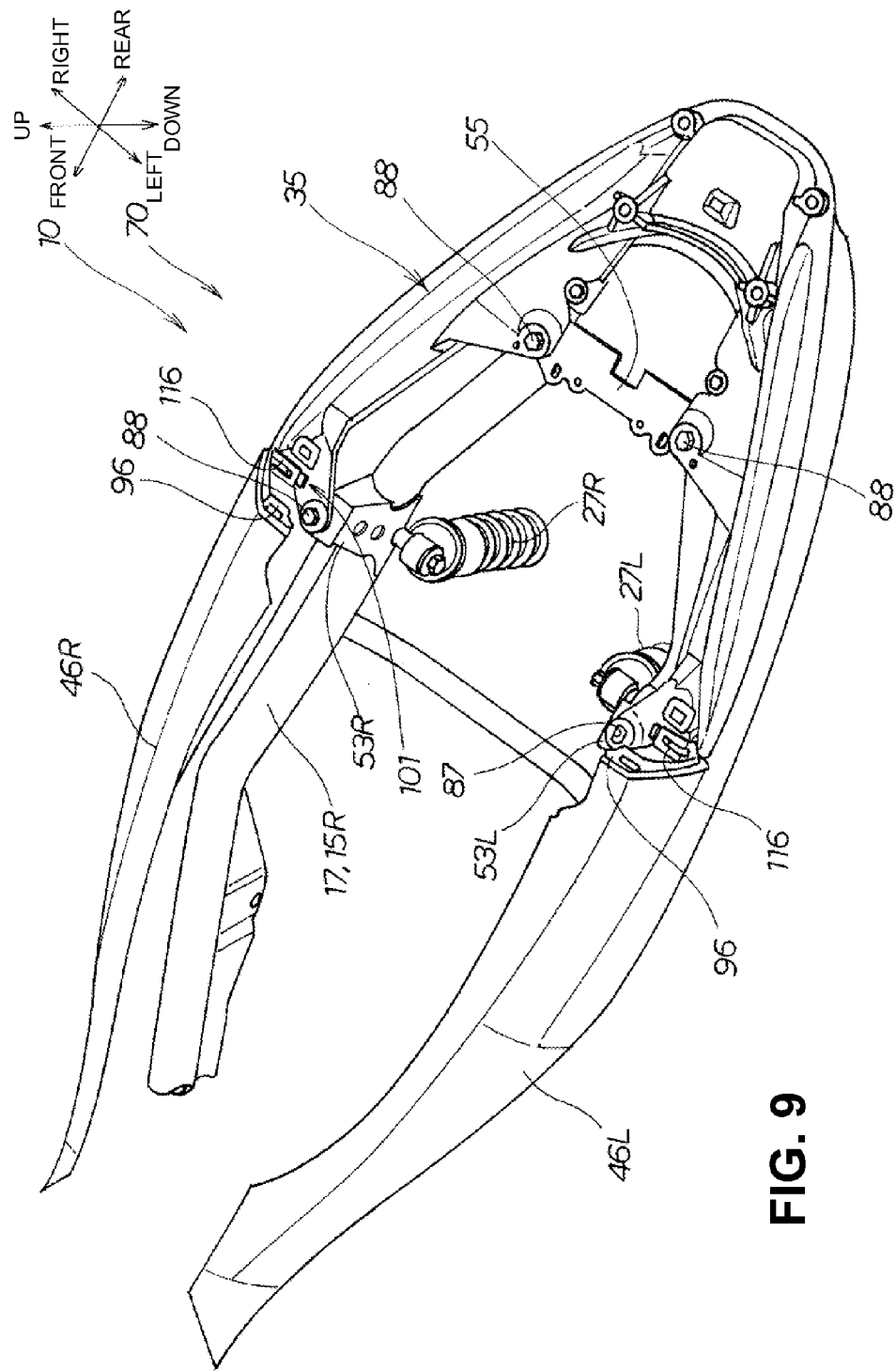
FIG. 9 is a perspective view of the rear structure (without the rear grip cover) of the motorcycle according to the present invention.

FIG. 9 shows the state before the rear grip cover 65 is attached, in which the rear grip member 35 is attached to the seat rail 15 and the second rack 116 provided on the rear body cover 46 engages with the body cover positioning section 101 provided on the rear grip member 35.

Figure 10:
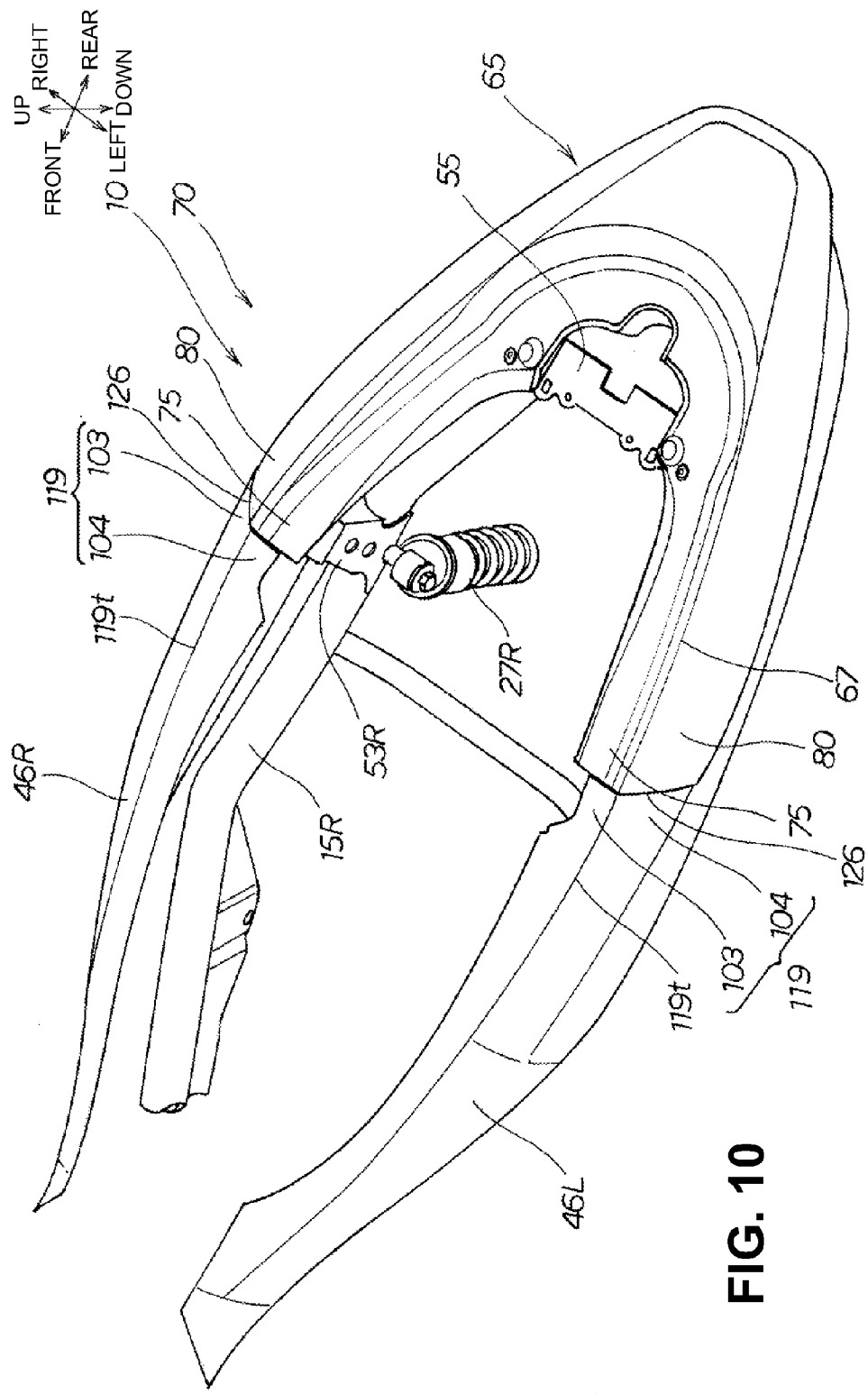
FIG. 10 is a perspective view of the rear structure (with the rear grip cover attached thereto) of the motorcycle according to the present invention.
Figure 11:
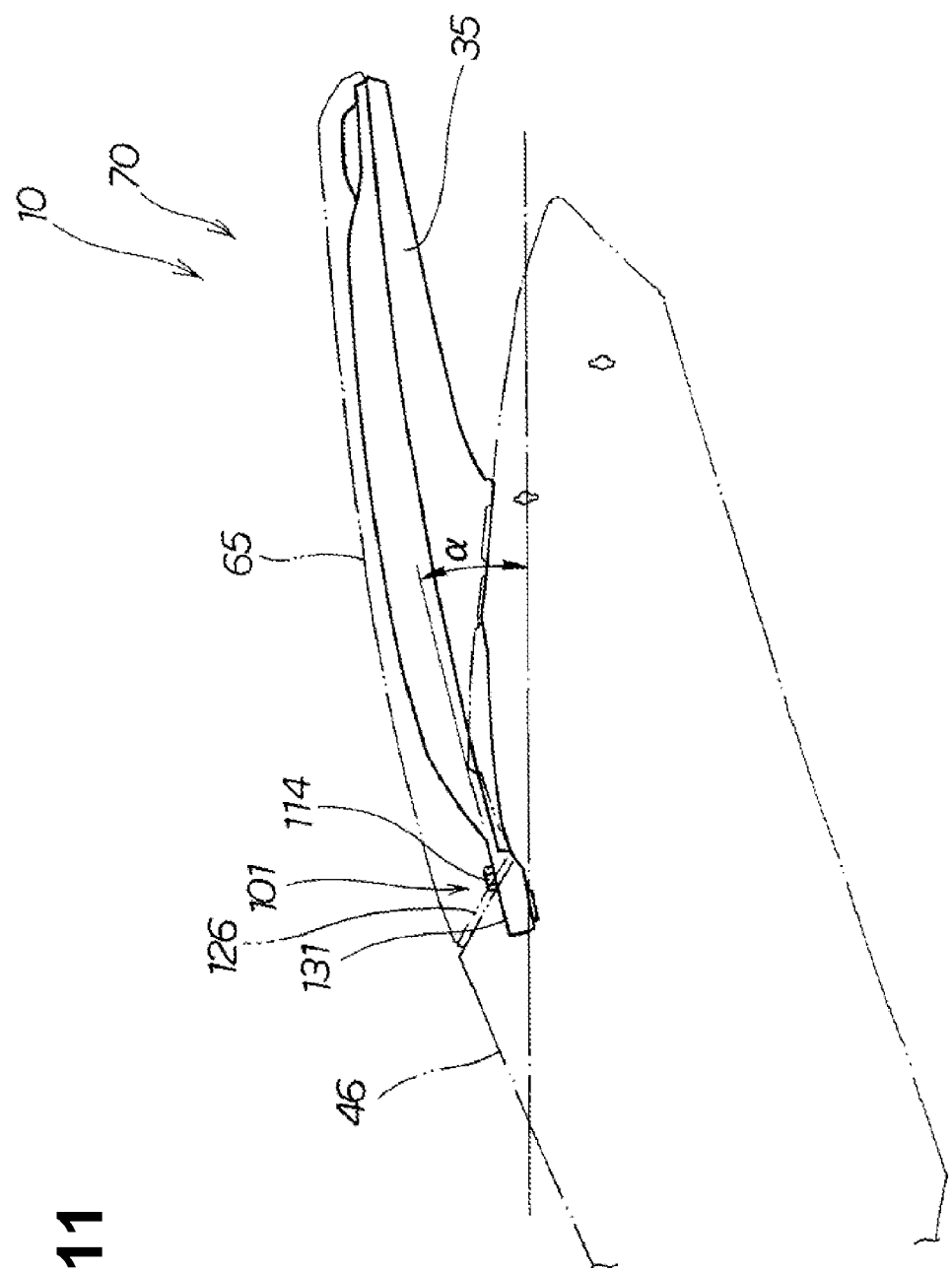
FIG. 11 is a side view illustrating the fit of a positioning section of the rear grip member into the body cover after the front portion of the body cover has been attached.

FIG. 10 shows the state after the rear grip cover 65 is attached. Because of the aforementioned structure of the engagement section and the fit section, the top surface 103 which is the exterior surface of the rear body cover and the top surface 75 of the rear grip cover can be made flush with each other, and also the slope 104 of the rear body cover and the slope 80 of the rear grip cover can be made flush with each other. In addition, the alignment of the ridge line 119t of the rear body cover and the ridge line 67 of the rear grip cover is facilitated, thus making it possible to improve the outward appearance of the vehicle.

Referring to FIGS. 5 through 7, the first engagement member 94 and the second engagement member 114 provided on the rear grip cover 65 are respectively engaged with the first engaging hole 97 and the second engaging hole 109 provided in the rear body cover 46. The first engagement member 94 and the second engagement member 114 extend in the vehicle transverse direction.

Accordingly, the external surface of the rear body cover 46 is flush with the external surface of the rear grip cover 65, so that the gap between the rear body cover 46 and the rear grip cover can be made constant, thus making it possible to improve the outward appearance of the joint section 126.

The structure of attaching the rear grip member to the seat rail and the like will be described below.

Referring to FIGS. 1, 4, 9 and 11, the front portion 137 of the rear body cover 46 is attached to the vehicle body frame 17 before the rear grip member 35 is fixed to the seat rail 15. The seat rail 15 is a component element of the vehicle body frame 17.

The rear grip member 35 includes a plurality of mounting holes 87 formed in an oval shape elongated in the vehicle longitudinal direction, and is mounted on the vehicle body frame 17 such that it can move in the fore-and-aft direction of the vehicle. Since the rear grip member 35 is provided movably, the body cover positioning section 101 formed on the top surface of the rear grip member 35 can be adjustably positioned with respect to the second engaging hole 109 formed in the rear body cover 46. The rear grip member 35 is fastened to the vehicle body frame 17 with the bolts 88 inserted through the mounting holes 87.

Since the top surface 131 of the rear grip member is inclined forward by a predetermined angle (α) relative to a horizon 132 and attached to the front bracket 53 and the rear bracket 55, the body cover positioning section 101 can be easily engaged in the second engaging hole 109 by attaching the front portion 133 of the rear body cover to the vehicle body frame 17 and then sliding the rear grip member 35 from the vehicle rear end into an area below the second rack 116.

Subsequently, the rear grip member 35 can be attached to a desired position in accordance with the mounting position of the rear body cover 46 while adjusting the position of the rear grip member 35 in the vehicle longitudinal direction, because the oval-shaped mounting holes 87 are formed in the rear grip member 35.

It may be noted that in the embodiment the mounting holes 87 of an oval shape elongated in the vehicle longitudinal direction are formed in the rear grip member 35, but the front and rear brackets 53R, 53L and 55 provided on the vehicle body frame may be formed in an oval shape to allow adjust the position of the rear grip member 35 with respect to the vehicle body frame 17 in the fore-and-aft direction of the vehicle.

The outline of a rear body structure for the vehicle according to the present invention is complied on the basis of the foregoing.

Figure 12:
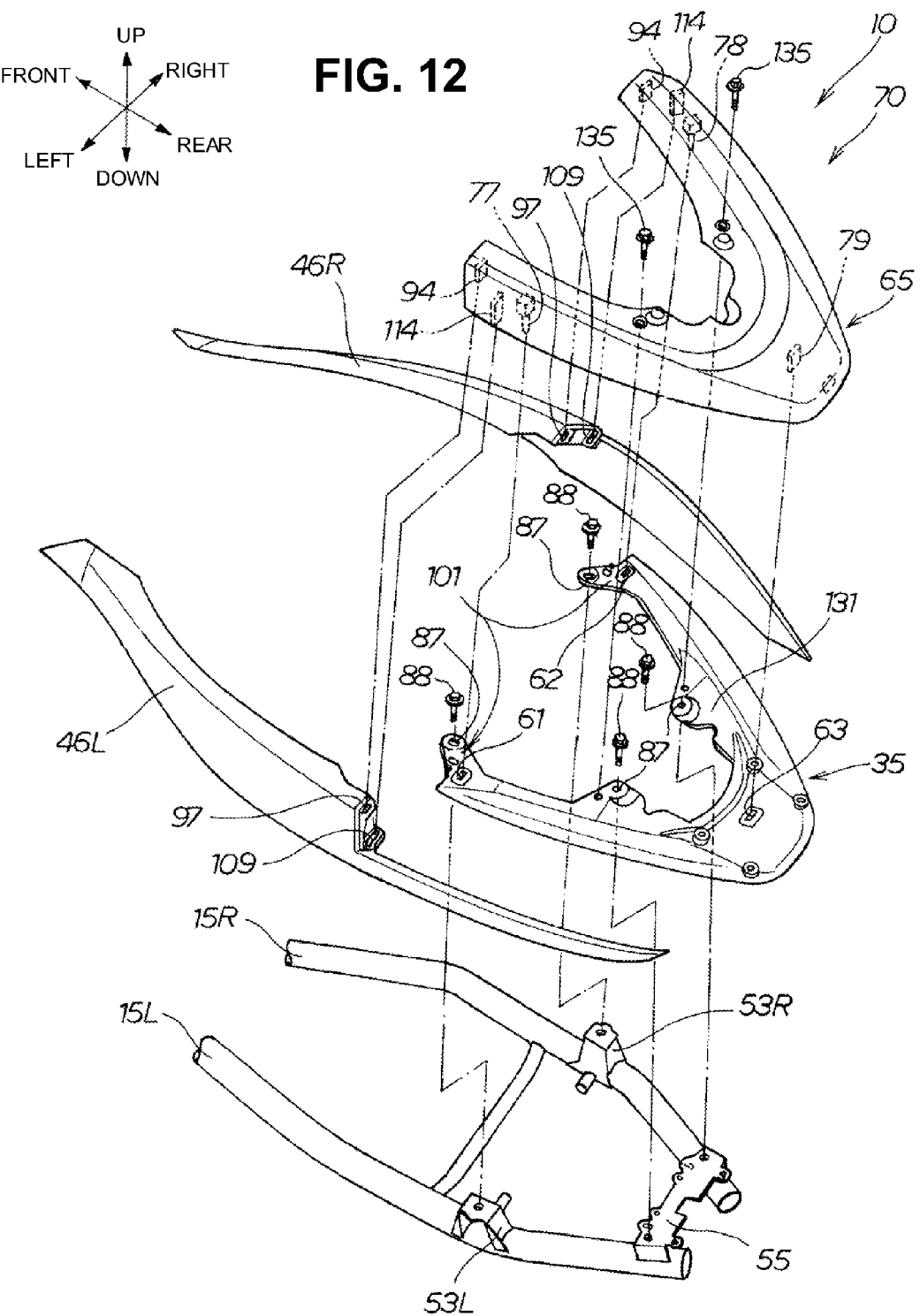
FIG. 12 is an exploded perspective view of the rear structure of the motorcycle according to the present invention.

As shown in FIG. 12, the front portions 137, 137 of the rear body covers 46R, 46L are attached to the vehicle body frame 17, and then the rear grip member 35 is inserted forward from the rear end of the vehicle to be engaged in the second engaging holes 109 formed in the rear body covers 46R, 46L, so that the body cover positioning sections 101 are positioned with respect to the second engaging holes 109.

The rear grip member 35 has four mounting holes 87 of an oval shape elongated in the vehicle longitudinal direction formed therein, so that the rear grip member 35 is fastened to the vehicle body frame with the four bolts 88 inserted into the four mounting holes 87.

After the rear grip member 35 is mounted on the seat rail 15, the first tab 77 to the third tab 79 provided on the rear grip cover 65 are engaged in the first fitting hole 61 to the third fitting hole 63 formed in the top surface 131 of the rear grip member, and also the right and left first engagement members 94 and the right and left second engagement members 114 which are provided on the rear grip cover 65 are engaged in the right and left first engaging holes 97 and the right and left second engaging holes 109 which are formed in the rear body cover 46. Then, finally, the rear grip cover 65 is fastened to the rear grip member 35 with machine screws 135.

Next, the operation of the rear body structure for the vehicle described above will be discussed As shown in FIG. 2, the body cover positioning section 101 is provided to the rear grip member 35, and the rear grip cover 65 is placed above the body cover positioning section 101. Due to such configuration, the body cover positioning section 101 are not visible externally.

In addition, the rear grip cover 65 and the main body cover 40 are both supported by the rear grip member 35. Since the rear grip cover 65 and the main body cover 40 are attached to the rear grip member 35, the rear grip cover 65 and the main body cover 40 can be attached with an increased assembly accuracy. If the assembly accuracy is increased, the joint sections 126 of the rear grip cover 65 and the rear body cover 46 can be smoothly joined together. Since the joint sections 126 are evenly joined, the outward appearance of the vehicle can be improved.

Returning to FIG. 6, the rear grip cover 65 is provided with the second engagement member 114 which is located outward from the portion of the rear grip cover 65 covering the body cover positioning section 101 in the vehicle transverse direction. By forming the second engagement member 114 in such manner, the rear grip cover 65 can be positioned with respect to the rear body cover 46, thus making it possible to evenly connect the joint sections 126, 126 (FIG. 2) of the rear grip cover 65 and the rear body cover 46 to each other. Since of the smooth connection of the joint sections 126, the outward appearance of the vehicle can be improved.

Returning to FIG. 12, in order to position the body cover positioning section 101 with respect to the second engaging hole 109, a portion positioned by the body cover positioning section 101 provided on the main body cover 40, the rear grip member 35 includes the mounting holes 87 of an oval shape elongated in the vehicle longitudinal direction, and is fastened to the vehicle body frame 17 with the bolts 88 inserted into the mounted holes 87.

With such rear body structure, a dimension error in the vehicle longitudinal direction which may be present in the rear body cover 46 can be absorbed by moving the rear grip member 35 in the vehicle longitudinal direction.

In the case where the main body cover 40 is attached to the vehicle body frame 17 before the rear grip member 35 is fixed to the vehicle body frame 17, when the rear grip cover 65 is attached to the rear grip member 35, the position of the rear grip cover 65 engaging with the rear grip member 35 can be moved in the vehicle longitudinal direction by moving the rear grip member 35 in the vehicle longitudinal direction. In other words, the movement of the rear grip member 35 in the vehicle longitudinal direction makes it possible to adjust the positional relationship between the rear body cover 46 and the rear grip cover 65.

If the adjustment for the positional relationship between the rear body cover 46 and the rear grip cover 65 is made possible, the surface 119 (external surface 119) of the rear body cover and the surface 75 of the rear grip cover can be flush with each other, thus making it possible to further improve the outward appearance of the vehicle rear area.

It may be noted that the present invention apply to a motorcycle in the embodiment, but the present invention may apply to a three-wheeled vehicle, and also may apply to a general vehicle without problems.

Also, according to the present invention, an engagement member that is provided on a rear grip cover and engages with a body cover may be disposed in a position inward from a portion covering a body cover positioning section in the vehicle transverse direction or approximately the same position in the vehicle transverse direction without problems.

INDUSTRIAL APPLICABILITY

The present invention is suitable for a motorcycle including a body cover provided in a rear area of the vehicle body, and a rear grip disposed above the body cover and allowing an occupant to hold the rear grip member.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A rear body structure for a vehicle, said vehicle comprising a vehicle body and a vehicle body frame which supports the vehicle body thereon, said rear body structure comprising:
an occupant seat configured to support an occupant thereon;
a body cover which is at least partially located below the occupant seat and which is configured to cover the vehicle body, said body cover comprising a first portion and a second portion;
a rear grip member which is located behind the occupant seat and is attached to the vehicle body frame; said rear grip member configured to allow a passenger occupant of said vehicle to hold the rear grip member during operation of the vehicle; and
a rear grip cover which is formed separately from and attached to the rear grip member, and which is configured to cover the rear grip member,
wherein, in an assembled state thereof, the first portion of the body cover overlaps a top surface of the rear grip member;
wherein the rear grip member comprises a body cover positioning section provided on a top surface thereof for positioning the body cover thereon;
wherein the second portion of the body cover is positioned by the body cover positioning section such that said second portion of the body cover is covered from above by the rear grip cover; whereby the second portion of the body cover is sandwiched between the rear grip member and the rear grip cover.

2. A rear body structure for a vehicle according to claim 1, wherein the rear grip cover comprises an engagement member which is arranged at a position closer to an edge of the rear grip cover than the body cover positioning section, and wherein said engagement member is engaged with the body cover.

3. A rear body structure for a vehicle according to claim 1, wherein:
the rear grip cover is structured such that an external surface thereof is continuously adjacent to the body cover through a joint section formed therebetween in a direction approximately perpendicular to a fore-and-aft direction of the vehicle;
said portion of the body cover, which is positioned by the body cover positioning section of the rear grip member, is arranged at a position spaced away from an external surface of the body cover through a vertical wall which extends in a direction approximately perpendicular to the external surface and has a normal extending approximately in the fore-and-aft direction of the vehicle; and
the rear grip member has an oval mounting hole formed therein, said hole being elongated in the fore-and-aft direction of the vehicle; wherein said rear grip member is fastened to the vehicle body frame via the oval mounting hole and a bolt.

4. A rear body structure for a vehicle according to claim 2, wherein:
the rear grip cover is structured such that an external surface thereof is continuously adjacent to the body cover through a joint section formed therebetween in a direction approximately perpendicular to a fore-and-aft direction of the vehicle;
said portion of the body cover, which is positioned by the body cover positioning section of the rear grip member, is arranged at a position spaced away from an external surface of the body cover through a vertical wall which extends in a direction approximately perpendicular to the external surface and has a normal extending approximately in the fore-and-aft direction of the vehicle; and
the rear grip member having an oval mounting hole formed therein, said hole being elongated in the fore-and-aft direction of the vehicle; wherein said rear grip member is fastened to the vehicle body frame via the oval mounting hole and a bolt.

5. A rear body structure for a vehicle according to claim 1, wherein the rear grip cover includes a substantially flattened top surface, a slope extending diagonally downward continuously from the top surface, and a ridge line forming a boundary between the slope and the top surface.

6. A rear body structure for a vehicle according to claim 1, wherein a top exterior surface of the body cover and a top surface of the rear grip cover are arranged to be substantially flush with each other.

7. A rear body structure for a vehicle according to claim 1, wherein each of the rear grip cover and the body cover is adjustably supported by the rear grip member.

8. A rear body structure for a vehicle according to claim 1, wherein the vehicle body frame comprises seat rails; and wherein the rear grip member is attached to the seat rails.

9. A motorcycle comprising
a vehicle body frame comprising seat rails;
a rider seat supported by said seat rails;
a body cover which is at least partially located below the rider seat, and configured to cover plural portions of the vehicle body frame; said body cover comprising a first portion and a second portion formed thereon;
a grip member arranged behind the rider seat, and attached to the vehicle body frame;
a grip cover which is formed separately from and attached to the grip member, and configured to cover the grip member,
wherein:
in an assembled state thereof, the first portion of the body cover is disposed above and overlaps a top surface of the grip member;
the grip member comprises a body cover positioning section provided on a top surface thereof for positioning the body cover thereon;
the second portion of the body cover is positioned by the body cover positioning section such that said second portion of the body cover is covered with the grip cover from above; whereby the second portion of the body cover is sandwiched between the grip member and the grip cover.

10. A motorcycle according to claim 9, wherein the grip cover comprises an engagement member arranged at a position closer to an edge of the grip cover than the body cover positioning section, and wherein the engagement member is engaged with the body cover.

11. A motorcycle according to claim 9, wherein:
the grip cover is structured such that an external surface thereof is continuously adjacent to the body cover through a joint section formed therebetween in a direction approximately perpendicular to a fore-and-aft direction of the vehicle;
said portion of the body cover, which is positioned by the body cover positioning section of the grip member, is arranged at a position spaced away from an external surface of the body cover through a vertical wall which extends in a direction approximately perpendicular to the external surface and has a normal extending approximately in the fore-and-aft direction of the vehicle; and the rear grip member having an oval mounting hole formed therein, said hole being elongated in the fore-and-aft direction of the vehicle; wherein said rear grip member is fastened to the vehicle body frame via the oval mounting hole and a bolt.

12. A motorcycle according to claim 10, wherein:

the grip cover is structured such that an external surface thereof is continuously adjacent to the body cover through a joint section formed therebetween in a direction approximately perpendicular to a fore-and-aft direction of the vehicle;

said portion of the body cover, which is positioned by the body cover positioning section of the grip member, is arranged at a position spaced away from an external surface of the body cover through a vertical wall which extends in a direction approximately perpendicular to the external surface and has a normal extending approximately in the fore-and-aft direction of the vehicle; and the rear grip member having an oval mounting hole formed therein, said hole being elongated in the fore-and-aft direction of the vehicle; wherein said rear grip member is fastened to the vehicle body frame via the oval mounting hole and a bolt.

13. A motorcycle according to claim 9, wherein the grip cover includes a substantially flattened exterior top surface, a slope extending diagonally downward continuously from the top surface, and a ridge line forming a boundary between the slope and the top surface; and wherein the exterior top surface of the body cover and a top surface of the grip cover are arranged to be substantially flush with each other.

14. A motorcycle according to claim 9, wherein each of the grip cover and the body cover is adjustably supported by the grip member.

15. A motorcycle comprising a vehicle body frame comprising seat rails;

a seat supported by said seat rails;

a main body cover comprising a front body cover, a tunnel cover arranged above the front body cover, a center body cover arranged continuously adjacent to the front body cover, and extending rearward of the front body cover, an underbody cover arranged continuously adjacent to the center body cover at a position located below the center body cover and extending rearward, and a rear body cover formed integrally with the center body cover, and arranged below the seat; said rear body cover comprising a first portion and a second portion formed thereon;

a grip member having a plurality of oval mounting holes formed therein, wherein said grip member is adjustably fastened, in a fore-and-aft direction of the vehicle, to the seat rails via the oval mounting holes;

a grip cover attached to the grip member, and configured to cover the grip member, wherein:

in an assembled state thereof, the first portion of the rear body cover overlaps a top surface of the grip member;

the grip member comprises a body cover positioning section provided on a top surface thereof for positioning the rear body cover thereon; and the second portion of the rear body cover is positioned by the body cover positioning section such that said second portion of the rear body cover is covered with the grip cover from above.

16. A motorcycle according to claim 15, wherein the grip cover comprises an engagement member arranged at a position closer to an edge of the grip cover than the body cover positioning section, and wherein said engagement member is engaged with the rear body cover.

17. A motorcycle according to claim 15, wherein:

the grip cover is structured such that an external surface thereof is continuously adjacent to the body cover through a joint section formed therebetween in a direction approximately perpendicular to a fore-and-aft direction of the vehicle;

said portion of the rear body cover, which is positioned by the body cover positioning section of the grip member, is arranged at a position spaced away from an external surface of the body cover through a vertical wall which extends in a direction approximately perpendicular to the external surface and has a normal extending approximately in the fore-and-aft direction of the vehicle.

18. A motorcycle according to claim 16, wherein:

the grip cover is structured such that an external surface thereof is continuously adjacent to the body cover through a joint section formed therebetween in a direction approximately perpendicular to a fore-and-aft direction of the vehicle;

said portion of the rear body cover, which is positioned by the body cover positioning section of the grip member, is arranged at a position spaced away from an external surface of the body cover through a vertical wall which extends in a direction approximately perpendicular to the external surface and has a normal extending approximately in the fore-and-aft direction of the vehicle.

19. A motorcycle according to claim 15, wherein the grip cover includes a substantially flattened exterior top surface, a slope extending diagonally downward continuously from the top surface, and a ridge line forming a boundary between the slope and the top surface; and wherein the exterior top surface of the rear body cover and a top surface of the grip cover are arranged to be substantially flush with each other.

20. A motorcycle according to claim 9, wherein each of the grip cover and the rear body cover is adjustably fixed with the grip member.

* * * * *